US006678284B1

(12) United States Patent
Verthein et al.

(10) Patent No.: US 6,678,284 B1
(45) Date of Patent: *Jan. 13, 2004

(54) COMMUNICATION ACCESS CHASSIS WITH GENERAL PURPOSE COMPUTING PLATFORM

(75) Inventors: William Verthein, Roselle, IL (US); Daniel L. Schoo, Island Lake, IL (US); Todd Landry, Grayslake, IL (US)

(73) Assignee: UTStarcom, Inc., Alameda, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/844,174

(22) Filed: Apr. 25, 2001

Related U.S. Application Data

(60) Continuation of application No. 08/813,173, filed on Mar. 7, 1997, now Pat. No. 6,249,527, which is a continuation-in-part of application No. 08/662,686, filed on Jun. 13, 1996, now Pat. No. 5,841,842, which is a division of application No. 08/212,515, filed on Mar. 11, 1994, now Pat. No. 5,577,105.

(51) Int. Cl.[7] .......................... H04L 12/28; H04L 12/66; H04J 3/16; G06F 15/16; H04M 11/00
(52) U.S. Cl. ...................... 370/465; 370/463; 370/467; 370/401; 709/217; 709/219; 379/93; 379/94
(58) Field of Search .................................. 370/465, 466, 370/467, 401, 402, 423, 463, 360, 415, 468, 536; 379/93, 94, 96, 202, 231, 234; 709/217, 219

(56) References Cited

U.S. PATENT DOCUMENTS

| 4,639,914 A | | 1/1987 | Winters .................. 370/110.1 |
| 4,796,292 A | | 1/1989 | Thomas ........................ 379/91 |
| 4,866,758 A | * | 9/1989 | Heinzelmann ............... 379/94 |
| 4,991,169 A | * | 2/1991 | Davis et al. ................ 370/463 |

(List continued on next page.)

FOREIGN PATENT DOCUMENTS

| WO | WO96/05549 | * | 7/1995 | ................. 395/200 |

OTHER PUBLICATIONS

Advertisement for "Hot Swap Rack Systems, Universal Input Power Factor Corrected or DC Inputs 24V and 48V" from Microsoft Internet Explorer, printed Sep. 9, 1997.
Advertisement for "Hot Swap 500HP Series, Universal Input Power Factor Corrected or DC Inputs 24V and 48V" from Microsoft Internet Explorer, printed Sep. 9, 1997.
Advertisement for "Ezraid Pro, Faster Disk Transfer Simplified Data Management Real–time Backups" from Microsoft Internet Explorer, printed Sep. 9, 1997.
Advertisement for "Hot Swap" from Microsoft Internet Explorer, printed Sep. 9, 1997.
Advertisement for "Switching Power's Hot Swap Line Offers . . . " from Microsoft Internet Explorer, printed Sep. 9, 1997.

Primary Examiner—Steven H. D Nguyen
Assistant Examiner—M. Phan
(74) Attorney, Agent, or Firm—McDonnell Boehnen Hulbert & Berghoff

(57) ABSTRACT

A communication access chassis having a general purpose computing platform provides communication access between remote users and computer network via the public telephone network. The general purpose computing platform is connected to an internal chassis bus complex transmitting incoming calls between a telephone line interface and a signal conversion system and between the signal conversion system and a local area network interface. The computing platform has a conventional microprocessor and local or peripheral memory storage devices and implements a commercially available open network operating system such as Windows NT™. By virtue of the ability of the general purpose computing platform to run network server programs locally, i.e., in the communication chassis, server functionality that has been provided only by remote computers on a local area network in the prior art is incorporated into the communications chassis itself, providing for improved network management, increased network security and reduced access and processing time, all in a manner transparent to the remote user.

15 Claims, 6 Drawing Sheets

U.S. PATENT DOCUMENTS

| | | | |
|---|---|---|---|
| 5,220,560 A | * | 6/1993 | Ogasawara ................. 370/466 |
| 5,247,516 A | | 9/1993 | Bernstein et al. ............. 370/82 |
| 5,361,259 A | * | 11/1994 | Hunt et al. ................. 370/402 |
| 5,374,952 A | | 12/1994 | Flohr ........................... 348/12 |
| 5,402,474 A | * | 3/1995 | Miller et al. .................. 379/93 |
| 5,416,776 A | | 5/1995 | Panzarella et al. ....... 370/85.11 |
| 5,438,614 A | | 8/1995 | Rozman et al. ............... 379/93 |
| 5,528,595 A | | 6/1996 | Walsh et al. ............. 370/85.13 |
| 5,577,105 A | | 11/1996 | Baum et al. .................. 379/93 |
| 5,598,536 A | * | 1/1997 | Slaughter, III et al. ..... 395/200 |
| 5,623,488 A | * | 4/1997 | Svennevik et al. ......... 370/360 |
| 5,636,218 A | * | 6/1997 | Ishikawa et al. ............ 370/401 |
| 5,742,596 A | * | 4/1998 | Bratz et al. ................. 370/356 |
| 5,761,281 A | * | 6/1998 | Baum et al. .................. 379/93 |
| 5,774,873 A | * | 6/1998 | Berent et al. ................. 705/26 |
| 5,790,548 A | * | 8/1998 | Sistanizadeh et al. ....... 370/401 |
| 5,799,068 A | | 8/1998 | Kikinis et al. ........... 379/93.06 |
| 5,802,150 A | * | 9/1998 | Beck et al. .................... 379/93 |
| 5,805,809 A | * | 9/1998 | Singh et al. ................ 709/203 |
| 5,841,842 A | | 11/1998 | Baum et al. |
| 5,884,046 A | * | 3/1999 | Antonov ..................... 709/238 |
| 5,889,958 A | * | 3/1999 | Willens ...................... 709/229 |
| 5,892,764 A | * | 4/1999 | Riemann et al. ............ 370/401 |
| 5,896,444 A | | 4/1999 | Perlman et al. .......... 379/93.35 |
| 5,898,780 A | | 4/1999 | Liu et al. ...................... 380/25 |
| 5,918,019 A | * | 6/1999 | Valencia ..................... 709/227 |
| 5,944,789 A | * | 8/1999 | Tzelnic et al. .............. 709/214 |
| 5,948,087 A | | 9/1999 | Khan et al. .................. 710/102 |
| 5,950,195 A | * | 9/1999 | Stockwell et al. ............. 707/4 |
| 5,978,841 A | * | 11/1999 | Berger ........................ 709/217 |
| 6,006,018 A | * | 12/1999 | Bernett et al. .............. 709/219 |
| 6,012,088 A | * | 1/2000 | Li et al. ...................... 709/219 |
| 6,061,650 A | * | 5/2000 | Malkin et al. .............. 704/228 |
| 6,112,242 A | * | 8/2000 | Jois et al. ................... 709/225 |
| 6,128,652 A | * | 10/2000 | Toh et al. ................... 709/219 |
| 6,173,311 B1 | * | 1/2001 | Hassett et al. .............. 709/202 |
| 6,249,527 B1 | * | 6/2001 | Verthein et al. ............. 370/466 |

* cited by examiner

COMMUNICATION ACCESS CHASSIS WITH GENERAL PURPOSE COMPUTING PLATFORM

RELATED APPLICATIONS

This application is a continuation of patent application Ser. No. 08/813,173, filed Mar. 7, 1997, now U.S. Pat. No. 6,249,527.

BACKGROUND OF THE INVENTION

A. Field of the Invention

This invention relates to the field of telecommunications and more particularly to communication access devices that allow for incoming and outgoing data communications to be transmitted between a multiplexed digital telephone line and a computer network such as a local or wide area network.

B. Description of Related Art and Advantages of the Invention

Computer networks have been typically linked to the public switched telephone network using various types of connection equipment, such as channel banks, PBX equipment, and gateway devices. Several references that describe such network access devices or related systems include the patents to Thomas, U.S. Pat. No. 4,796,292; Miller et al., U.S. Pat. No. 5,402,474; Ogasawara et al., U.S. Pat. No. 5,220,560. Other references of interest include the patents to Hunt et al., U.S. Pat. No. 5,361,259; Flohr, U.S. Pat. No. 5,374,952 and Yoshida, U.S. Pat. No. 5,247,516. The patent to Davis, U.S. Pat. No. 4,991,169, describes an all-digital DSP approach for interfacing between a telephone line and a host computer system.

In the past, network access devices such as channel banks and PBXs have been viewed simply as access devices for the host computers on the network. The signal processing and computational capabilities built into such devices were primarily devoted to A/D and modem signal conversions for the incoming and outgoing calls, protocol processing necessary to interface with the local area network and perform routing functions, and processing associated with multiplexing and demultiplexing functions to receive or transmit calls to time slots on a time division multiplexed carrier system, such as T1.

The present invention represents a significant departure from the prior art approach to the role and limited functionality of communication access devices per se. Whereas in the prior art communication access devices have been designed to perform a limited role in terms of call processing and routing, with the ultimate destination for the calls being one or more host computers on the local area network, we have developed a communications server chassis that, in addition to providing the network access functions of an integrated communications router, also includes a general purpose computing platform. The platform runs a commercially available stand alone or shareware operating system such as Windows® NT from Microsoft Corporation. The software running on the computing platform may perform, for example, network management, remote access, intranet web page, and other functions.

A communication access device with the integral general purpose computing platform, as described herein, provides a substantial advancement in the features and capabilities of a communication access device. For example, in an embodiment in which the communication access device is connected to the network, improved remote access service may be achieved since the general purpose computing platform can route certain calls to the LAN while terminating other calls, such as those calls that require access to information that is stored locally in the memory in the general purpose computing platform. Additionally, the general purpose computing platform may provide enhanced network management service efficiently controlling the flow of calls between the access device and the network. The general purpose computing platform may also provide protocol proxy service and authentication services.

The installation of the general purpose computing platform in the communications access device allows for calls from remote users that dial into the chassis to be terminated in the general purpose computing platform. The host computer on the local area network that would be the endpoint of an incoming call in the prior art, is, in both reality and in effect, placed into the communication access device itself. Moreover, since the communication access device has the capability of handling a large number of incoming calls at the same time, due to the call processing and signal conversion circuitry included in the chassis and described below, the communication access device can perform both communication access and information access functionality at the same time in the same physical chassis. This feature can result in improved network security since it enables the communication access device to be physically and electrically isolated from the local area network, since calls are terminated at the communications chassis. This is all accomplished in a manner completely transparent to the remote user.

These and many other features and advantages of the invention will become more apparent from the following detailed description of preferred embodiments of the invention.

SUMMARY OF THE INVENTION

A modular communication access chassis having incorporated therein a general purpose computing platform processes calls from remote users representing digital information between a multiplexed digital telephone line and a network, so as to enable a remote data terminal connected to the digital telephone line to communicate via the communications access chassis with a host computer on the network. The chassis includes a telephone line interface connecting the chassis with a multiplexed digital telephone line and a network interface connecting the chassis to a local or wide area network. A signal conversion system, such as a group of modems, is provided for conversion of telephone signals from the remote users into a digital format compatible with signal processing requirements of the computer network. At least one internal chassis bus is provided for transmitting data between the telephone interface and the signal conversion system and between the signal conversion system and the network interface.

A general purpose computing platform is installed in the communications chassis. The general purpose computing platform further comprises an interface providing direct communication access between the general purpose computing platform and the internal chassis bus, allowing access and control by the computing platform of the signal conversion system, the telephone interface, and/or the network interface. The computing platform has a conventional IBM PC compatible architecture, including a processor and local or peripheral memory storage devices. The computing platform implements a commercially available stand-alone or shareware open network operating system, such as Windows® NT™. By virtue of the ability of the general purpose computing platform to run network server programs on the operating system locally, i.e., in the communication chassis, computing functionality that has been provided only by remote computers on a local area network in the prior art is incorporated into the communications chassis itself, providing for improved network management, increased network security and reduced access and processing time, all in a manner transparent to the remote user.

In a preferred form, the chassis comprises a plurality of slots receiving cards incorporating therein the telephone interface, network interface and the signal conversion system, and wherein the communications chassis further comprises at least one card, insertable into said one of the slots, having incorporated therein the general purpose computing platform.

In one embodiment of the invention, the general purpose computing platform memory stores a set of data bases and other information in its memory that is requested by remote data terminals, in a manner akin to a typical server on a local area network. The general purpose computing platform is coupled to the internal chassis bus and receives packets of data from the signal conversion system. The call from the remote data terminal is terminated at the communication chassis in the general purpose computer platform, without transmission of the call through the network interface onto the network. This provides for enhanced network security, since the communication access chassis can be physically and electrically isolated from the local network, yet provide full remote access and server functionality to remote users.

DETAILED DESCRIPTION OF THE PREFERRED EMBODIMENT

Figure 1:
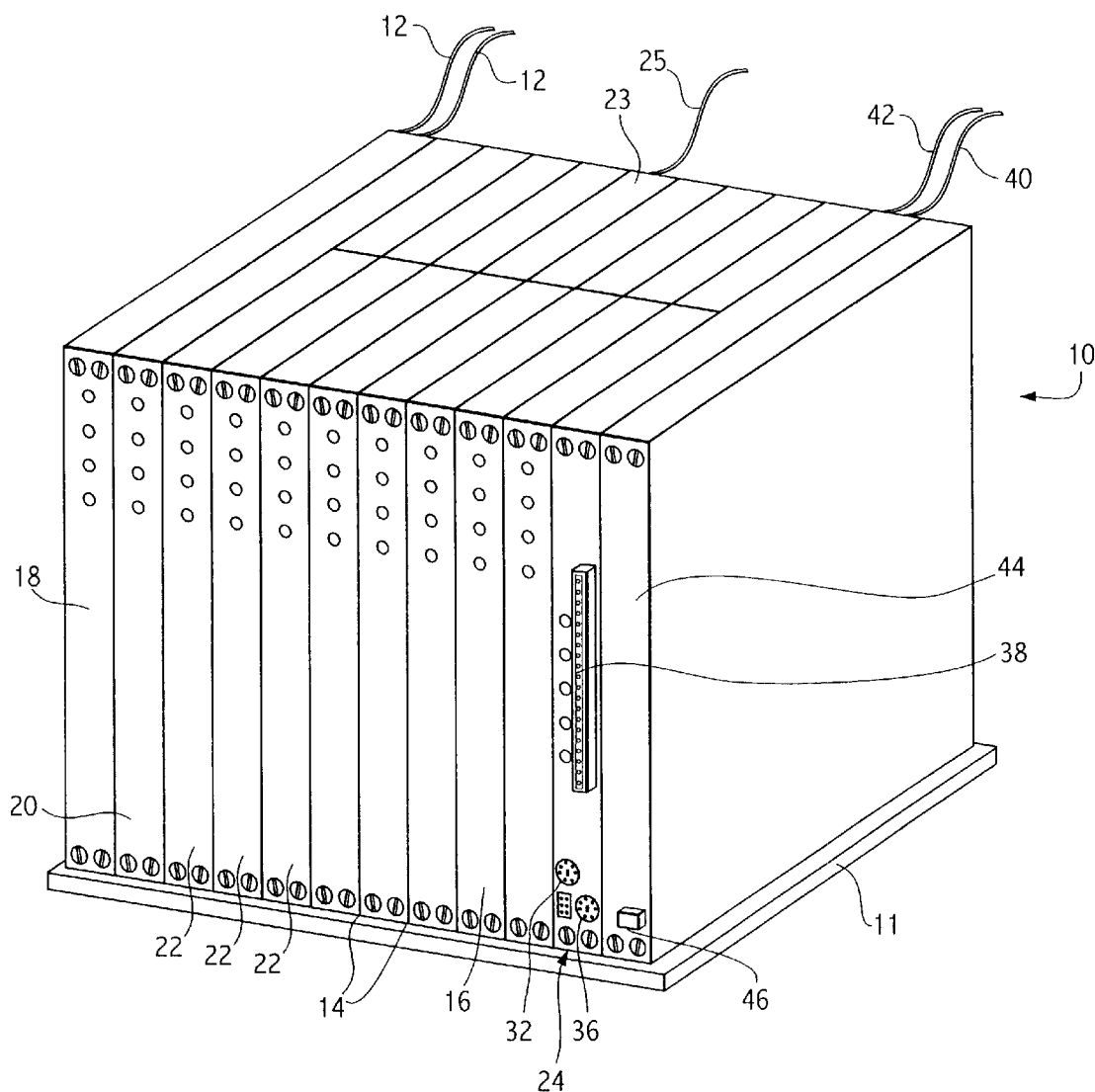
FIG. 1 is a perspective view of a communications chassis in accordance with the invention showing the chassis having multiple slots for multiple cards, including telephone line interface cards, modem cards, and a card we have termed an "EdgeServer"™ card that has incorporated thereon the hardware components comprising a general purpose computing platform, plus user interface ports, and external disk drive, and a network interface.

FIG. 1 is a perspective view of a representative network access communications chassis 10 in accordance with a preferred form of the invention. The communications chassis 10 processes digital calls between remote users (i.e., data terminal equipment) that are connected to the chassis 10 via the public switched telephone network and one or more incoming digital telephone lines 12, such as T1, E1, or ISDN Primary Rate Interface (PRI) lines. The communications chassis 10 may provide for network access capability for the remote users via a network interface and associated circuitry, as described below.

The chassis 10 of FIG. 1 has a housing 11 containing multiple slots 14 for receiving multiple cards 16, each card 16 typically having a set of components to perform certain functions. The cards 16 are all connected to each other by a high speed internal chassis bus system. The cards shown inserted into the slots in the illustrated embodiment include a telephone line interface card 18 and a telephone line application card 20 which perform certain multiplexing and demultiplexing functions for the chassis relative to the telephone lines 12. The chassis also has a set of cards 22 containing modems for performing signal conversions for incoming and outgoing data. The modems convert data into a format compatible with transmission requirements of the digital telephone line 12 (such as log PCM) and formats compatible with the processing requirements of the EdgeServer™ card 24 having a general purpose computing platform and the host computers on the local area network in a well known manner. The chassis may optionally have a management card for managing the operation of the chassis.

The "EdgeServer"™ card 24 has incorporated thereon the hardware and software components comprising a general purpose computing platform. The EdgeServer™ card 24 further includes one or more user interface ports for receiving cables connected to user interface devices, such as a video monitor interface 32, a mouse interface 34, and a keyboard interface 36, enabling a user to interface with the general purpose computer in the chassis. The EdgeServer™ card 24 further includes a hard disk memory (reference 72 in FIG. 2) for storing commercially available software programs and databases and programs of interest to the remote users that may dial in to the communications chassis 10. The EdgeServer™ card 24 includes an external disk drive 38 for a diskette, enabling a user to download programs or data bases, or other information onto the hard disk, and a bus interface for connecting the general purpose computing platform to external memory storage devices on a bus such as a SCSI or SCSI-2 bus 40. The card 24 further has an interface to an industry standard network used to connected remote computers to the chassis over a network 42 such as an Ethernet or Token Ring network. The network access and interface circuitry in the EdgeServer™ card 24 performs certain protocol processing and placing the calls on a local or wide area network 42 that is connected to the chassis 10. Additionally, the card 24 has the ability to terminate calls locally, i.e., in the chassis 10.

The communication access chassis of FIG. 1 includes a power supply unit 44 connected via a power cord 46 to a conventional power source. All of the cards 16, 18, 20, etc., including the EdgeServer™ card 24, are "hot swappable" in known manner into and out of the chassis 10, i.e., when the chassis is in a powered condition, the EdgeServer™ card 24 may be operably inserted into or removed from a slot in the chassis, without requiring the power to be removed from the chassis 10. This is a particularly advantageous feature, since turning the power off effectively disconnects all the calls that are in progress at the time.

The communication access chassis 10 of FIG. 1 (and the individual cards that make up the chassis, including the EdgeServer™ card) is now commercially available from U.S. Robotics Access Corp., 8100 N. McCormick Boulevard, Skokie, Ill., the assignee of the present invention. The product is known commercially as the Total Control Network Enterprise Hub™, and persons of skill in the art are familiar with this product or with analogous products available from other telecommunications companies, to such as Ascend Communications, Inc., Livingston, Cascade Communications, and Multitech. The cards that make up the chassis are described in detail in the operators manual that comes with the sale of the Network Enterprise Hub™, which is incorporated by reference herein.

The telephone line interface and application cards 18, 20, modem cards 22, and internal chassis bus, and computer network interface 66 (see FIG. 2) of the EdgeServer™ card 24 are described in great detail in terms of their component circuitry and operation in two issued United States patents, assigned to U.S. Robotics, which are fully incorporated by reference herein: U.S. Pat. No. 5,577,105 of Baum et al., enitled "Telephone Call Switching and Routing Techniques for Data Communications," and U.S. Pat. No. 5,528,595 of Walsh et al., entitled "Modem Input/Output Signal Processing Techniques". The detailed structure of a preferred internal chassis bus is described in U.S. Pat. No. 5,416,776 to Panzarella et al., entitled "Modem Backplane Techniques", also assigned to U.S. Robotics, which is incorporated by reference herein. The management of a chassis by a management card is also described in detail in U.S. Pat. No. 5,436,614 to Panzarella et al., entitled "Modem Management Techniques," which is also assigned to U.S. Robotics and incorporated by reference herein.

Figure 2:
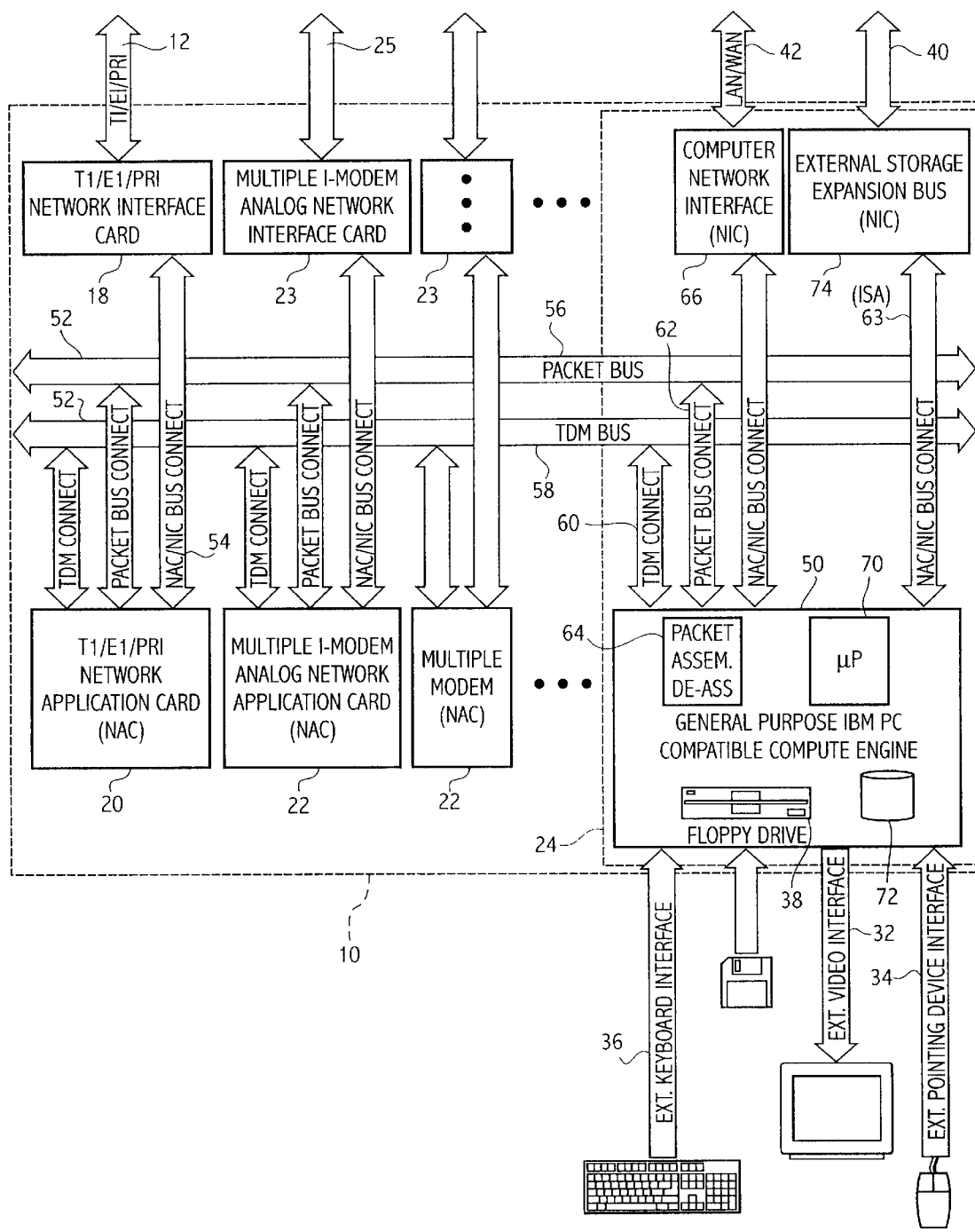
FIG. 2 is a block diagram of the communications chassis that incorporates a general purpose computing platform in accordance with a preferred form of the invention.

The chassis of FIG. 1 is shown in block diagram form in FIG. 2. Since the details of the telephone line interface and application cards 18, 20, modem cards 22, management cards (not shown) and computer network interface 66 of the EdgeServer card are already described elsewhere and persons skilled in the art already know how to build and design such circuits (or equivalent circuits), a detailed discussion of these components of the communication access chassis 10 is not necessary. Additionally, the details as to the architecture or design of the communication chassis 10 is not particularly important. What is believed to be novel is the integration of a general purpose computing platform 50 into a communication access chassis, the connection of the general purpose computing platform 50 to the telephone interface 18, 20 elements, network interface 66, and signal conversion system 22 via an internal chassis bus complex 52, and the manner in which such a chassis may be used. The particular arrangement of components on individual cards or the division of functionality (e.g., telephone interface, modem signal conversions, etc.) among individual cards is not important. Thus, while the inventors' best mode known for practicing the invention will be set forth in the context of the particular chassis 10 in FIGS. 1–6, it will be appreciated that the inventors do not consider the invention limited to the particular chassis architecture shown.

With reference to FIG. 2, the chassis 10 includes the telephone network interface card 18 connected to a digital telephone line 12 such as T1, E1 or a ISDN primary rate interface (PRI). The interface card 18 has connectors that physically receive the telephone lines, and a CSU line interface unit to recover clock signals and data from the incoming signals and perform multiplexing and demultiplexing functions for outgoing and incoming data stream to place the calls into the time slots of the carrier. The card 18 transmits the telephone signals via a NICINAC (network interface card/network application card) bus 54 to the T1/E1/ISDN PRI/ network application card 20. The application card 20 provides framing for the recovered telephone line data to extract the T1 DS0 channel data (or ISDN 2B+D channel data incorporated into the ISDN PRI signal), and then switches the channel data to time slots on an internal chassis bus complex 52 comprising a time division multiplexed bus 56 for transmission to a signal conversion system, described below. The internal chassis bus 52 further includes a high speed parallel packet bus 58 connecting all of the modules or cards of the chassis 10 as shown.

The time division multiplexed bus 56 provides 8 kilo bytes per second connections between as many as 256 end devices or modules. The bus complex includes a frame sync line, a time slot clock line, a bit clock line and two data highway lines (not shown). The connections on the TDM bus 56 between the telephone application card 20 and the modems in the modem cards 22 are static or "nailed up" connections and are established on power-up of the chassis 10. There are 64 time slots in each frame on the TDM bus 56. Each modem in the chassis is assigned an individual time slot. During a time slot, a modem will read one octet of data from one of the TDM bus highways and write one octet of data to the other highway. The TDM bus 56 thus provides a pathway for the recovered channel data in PCM form (for T1) or raw digital data (for an ISDN line) to be assigned and routed from the T1/E1/PRI NAC 20 to the modems or their equivalent in the modem network application cards 22.

The chassis 10 includes a signal conversion system for conversion of telephone signals from the remote users on the TDM bus into a digital format compatible with signal processing requirements of the general purpose computing platform and the computer network connected to the chassis, and vice versa. This signal conversion system takes the form of a set of modem network application cards 22 which each contain a plurality of modem DSPs and associated circuitry for performing modem signal conversions on PCM telephone signals sent to the cards via the TDM bus 56. The number of individual modems on a card 22 is not particularly significant, and in the preferred embodiment there are four such modems per card. The total number of modem network application cards 22 depends on the number of individual communication channels on the telephone line 12 the chassis 10 is connected to and the number of modems per card, with the idea being that one modem for each data channel on the digital telephone line 12 is needed. The modem network application cards 22 include interface circuitry for receiving and transmitting TDM telephone bus signals relative to the TDM bus 56, and drivers for placing demodulated data signals onto a parallel packet bus 58 linking all the cards in the chassis as shown. For an ISDN line, the signal conversion system may comprise one or more ISDN terminal adapters for converting the raw digital data into forms compatible with the general purpose computing platform 50 in the chassis 10 and the computers connected to the chassis 10 via the network 30 or 42.

The chassis 10 further includes a set of multiple modem network interface cards 23 that contain RS-232 drivers for placing serial data from the modems in the modem application cards onto a computer connected to the chassis via cable 25. Additional functionality may be incorporated into the modem network interface card 23, such as a CODEC for connecting the chassis to an analog phone line, and ISDN BRI circuitry.

Communication between the modules or cards of the chassis 10 is via the high speed parallel packet bus 58 which is part of the internal chassis bus complex 52. While there are many equivalent busses that can be used for this function (both packet and non-packet), such as an ISA bus, a preferred one in the illustrated embodiment is a packet bus conforming to the ANSI/IEEE NuBus standard. This bus is a 32 bit parallel bus operating at 10 MHz . The available bandwidth on the bus 58 is divided among the modems or other elements that currently have data to transmit across the bus 58. The parallel bus 58 transmits data between the modems in the modem network application module 22 and the EdgeServer™ card 24 in packets in a digital form compatible with data processing requirements of a general purpose computer 50.

As shown in FIG. 2, the EdgeServer™ 24 card can accesses telephone bus signals on TDM bus directly via the TDM bus connect or interface 60 and associated TDM transmit and receive drivers and associated circuitry incorporated into the computing platform 50, generally as described in the above-referenced Baum et al. and Walsh et al. patents. The EdgeServer™ card 24 is thus provided with direct access via the TDM bus with the telephone signals from the telephone line application 20 and interface 18 cards. Incoming data from the remote user on the telephone line 12 may be transmitted in log PCM form (or other form depending on the choice of telephone line) via the TDM bus 56 to well known modem circuitry (not shown) within the EdgeServer™ card 24.

Ordinarily, however, the data will be routed first to the signal conversion system, i.e., modem cards 22, and converted into a form compatible with the processing requirements of the general purpose computing platform 50 in the EdgeServer™ card 24, and transmitted via the parallel packet bus 58 to the parallel bus interface circuitry 62 in the card 24. The packets of data on the parallel bus 58 will ordinarily be of a smaller size, and have different headers due to the requirements of the packet bus, than the data packets used by the operating system or applications programs (e.g., Window™ NT) running on the EdgeServer™ card 24. Therefore, packet assembly and de-assembly for incoming and outgoing packets is performed at the parallel bus interface as indicated at 64 between the parallel bus 58 and the computing platform 50. This assembly and de-assembly is according to well known techniques is considered to be conventional and well within the ability of persons of ordinary skill in the art.

By virtue of the interfaces 60 and 62 between the general purpose computing platform 50 and the TDM and parallel busses 56 and 58, respectively, the EdgeServer™ card 24 has direct communication access with the telephone interface cards 18, 20 and the signal conversion system 22. In some specific applications of the invention, it may not be necessary to connect the computing platform 50 directly to all of the elements or cards of the chassis. For example, the computing platform 50 may need to have access only to the parallel bus 56.

The EdgeServer™ card 24 further includes a "gateway" or network interface 66. The interface 66 receives demodulated data from remote users from the signal conversion system in the modem cards 22 via the parallel bus 58, packet bus connect 62, and NACINIC bus 63 and processed by the Edgeserver™ card 24. The interface 42 also receives digital data from host computers connected on the network 42 destined for the remote users. The interface 66 has DSP and associated circuitry for performing industry standard IEEE 802.3 and IEEE 802.5 protocol processing and forming data into packet forms suitable for placement on the computer network 42 connected to the chassis 10. The interface 66 contains buffers and industry standard network interface controllers and network interface drivers for placing data on the network 42 and receiving data from the network 42.

Figure 3:
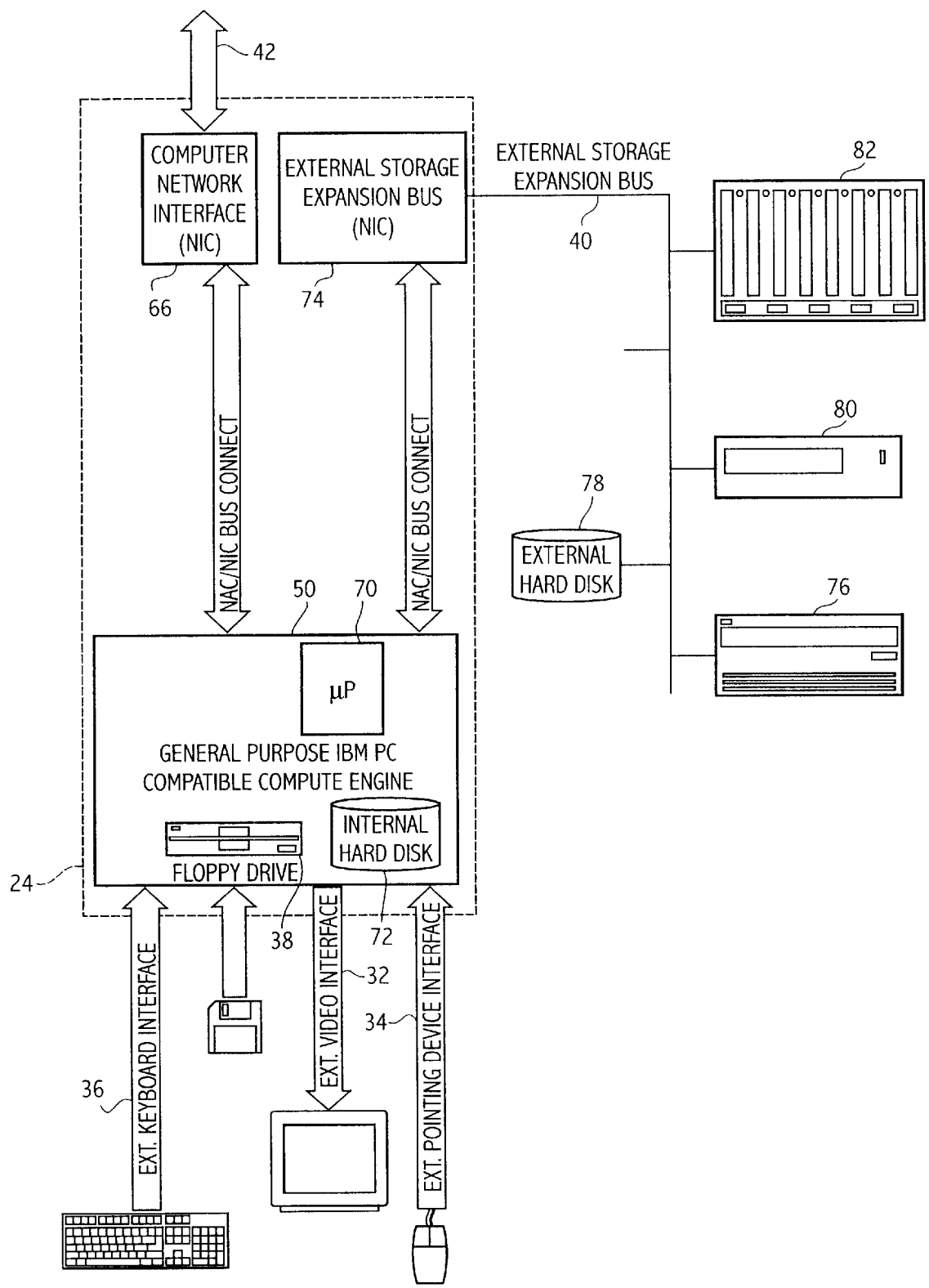
FIG. 3 is a block diagram of the EdgeServer™ card showing the external peripheral bus from the card leading to various peripheral memory storage devices.

The general purpose computing platform 50 in the communications chassis 10 is based on a well known and industry standard IBM compatible PC architecture, such as an off-the-shelf IBM PC compatible computer. The platform has the suite of hardware and interfaces that is commonly associated with a PC—a processor such as an Intel 486DX4 100 MHz processor 70, a high storage capacity internal hard drive memory 72, an industry standard Ethernet or other LAN interface 66 that is appropriate for the particular installation requirements of the chassis, and the video port 32, keyboard port 36, a serial port (not shown) and a mouse port 34. As shown in FIG. 3, the computing platform 50 is also preferably provided with a peripheral or external memory storage expansion bus interface 74 connected to an industry standard bus 40 (e.g., SCSI, SCSI-2 or USB) with additional storage devices such as CD-ROMs 76, additional hard disks 78, back-up systems such as a tape drive 80 and redundant arrays of inexpensive disks 82 connected to the bus 40. In this embodiment, the memory capacity for the card may be significantly expanded and reside primarily on the external bus 40.

The hard disk 72 for the computing platform 50 card may either be a single disk, more than one disk, or mirrored in pairs. The hard disk 72 functions as the primary data storage for the programs or information accessed by remote users calling into the card 24. The hard disk 72 further stores the operating system running that is booted up when the chassis 10 is turned on or when the card 24 is inserted in the chassis 10. The card 24 has floppy disk drive 38 which provides a means for loading new programs for the operating system running in the computing platform or exchanging data with other computers.

The general purpose computing platform 50 is ideally capable of running a commercially available operating system, preferably an "open" network operating system. The operating system may be a UNIX™-based operating system, Solaris 86™, Windows® NT™, Novell Netware, BSDI UNIX from Berkeley Software Design Inc., or otherwise. One of the principal features of the preferred embodiment is that with the general purpose computing platform 50 installed in the chassis 10, running a commercially available network operating system such as Windows® N™, commercially available programs for the system such as Windows® NT™ RAS (Remote Access Service) can be loaded onto the hard disk 72 (or external memory devices) and immediately used to provide remote access and network management functions for the communications chassis 10, with no additional training, set-up, configuration, custom programming or management needed for persons familiar with Windows® NT™ The LAN or MIS administrator does not need to develop it internally. Because the internal chassis bus 52 connects the computing platform 50 with the modem cards 22, telephone line interface and application cards 18 and 20, the computing platform 50 can readily manage the traffic through the chassis 10, intercept some calls and terminate the calls at the general purpose computing platform 50, or route others through the gateway interface 66 onto the network 42.

Figure 4:
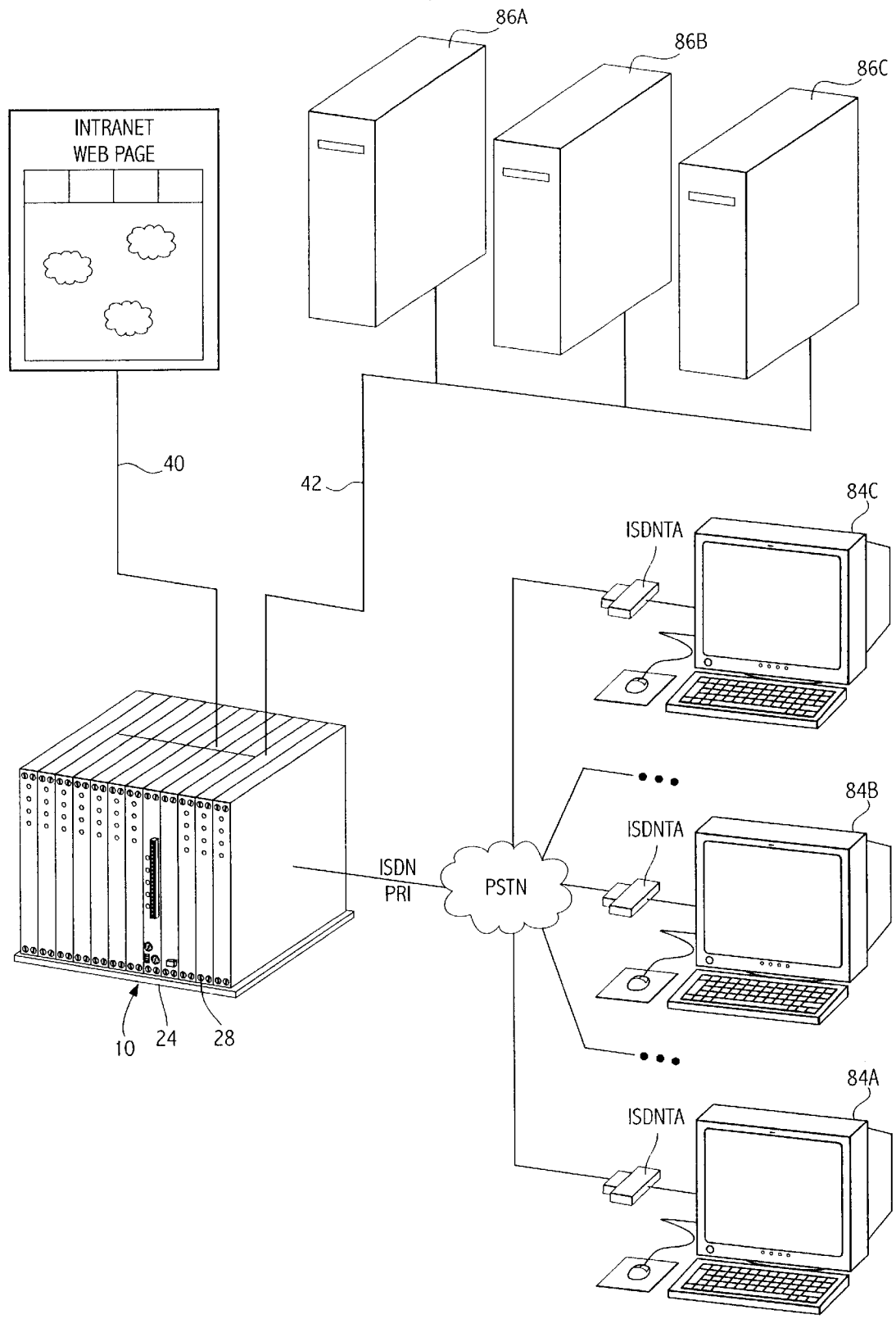
FIG. 4 is a schematic illustration of one possible installation of the communications chassis of FIGS. 1 and 2, with the chassis connected to a local area network and facilitating communication between remote users and server computers on the local area network.

Some examples of these features will be described in conjunction with FIG. 4, FIG. 5 and FIG. 6. FIG. 4 is a schematic illustration of one possible installation of the communications chassis 10 of FIGS. 1–3, with the chassis 10 connected to a local area network 42 and facilitating communication between a plurality of remote users represented by computers 84A, 84B and 84C and server computers 86A, 86B and 86C on the local area network 42. The example of FIG. 4 is fully applicable to WAN topologies. A plurality of remote users 84A etc. are connected via the telephone network PSTN and ISDN PRI 12 to the communications chassis 10 of FIGS. 1–3. The remote users need not be persons operating personal computers, but rather the illustration of the computers 84A, 84B and 84C is intended to encompass data termination equipment and computers generally.

The communication access chassis 10 is shown connected to a LAN 42 having multiple server computers 86A, 86B, 86C etc. In the example of FIG. 4, one server 86A is devoted to corporate data bases, one 86B is devoted to sales and marketing, and the other server 86C is devoted to human resources. General corporate information of interest to the remote users is stored on one of the hard disks 78 (FIG. 3) connected to the EdgeServer card 24 via the external bus 40 (or of course it can be stored on the local hard disk 72 or the one of the RA/D memories 82).

The general purpose computing platform 50 in the communication access chassis 10 functions as a gateway to direct requests from the remote users 84A, 84B, to the appropriate server 86A, 86B, 86C etc. This functionality is built into the programs running on the computing platform operating system (e.g., Windows® NT™), and can be physically accomplished, for example, by using TCP/IP header information for the individual calls in the netvvork interface 66, using MF tones or signaling schemes in the incoming call during call set-up in the manner described in detail in the Baum et al. patent referenced above, using a management card or in still other ways. In this embodiment, security and firewall functionality reside on the computing platform 50 in the communication chassis 10, providing an additional measure of security for the LAN 42.

In a preferred embodiment, Window NT™ Remote Access Service is run on the general purpose computing platform 50. Remote Access Service is a program that takes data from the communication interface at the modems in cards 22 and directs calls to destinations on the local area network, or directs calls to be terminated in the EdgeServer card 24 in the chassis 10. Several component features in RAS may be implemented. One is DHCP (Dynamic Host Configuration Protocol). This is an industry standard protocol for automatically assigning Internet Protocol (IP) configurations to remote work stations on LAN 30, eliminating the need for manually configuring each work station. A second is WINS (Windows Internetwork Name Service), a distributed database for registering and querying dynamic name to IP address mappings in a routed network environment. A third is Multilink Channel Aggregation, which enables remote users 84A, 84B, etc. dialing into the chassis 10 to combine several dial-up lines in the telephone line to achieve faster data transfer speeds.

Furthermore, by virtue of the memory capacity of the computing platform 50 in the chassis 10, either resident on the card 24 or accessible via a peripheral bus 40 as shown in FIG. 3, select information of interest frequently requested by remote users (such as product and pricing information) may be stored in the memories for the computing platform 50. The calls are terminated in the general purpose computing platform 50 in the chassis 10. For example, referring to FIGS. 2 and 4, after the modem in the modem card 22 has demodulated the incoming call into a format compatible with the computing platform 50, the call is placed on the parallel bus 58. The packets of data are transmitted to the parallel bus interface 62 for the card 24, assembled into packets compatible with the operating system of the computing platform by the packet assembler 64, and processed by the applications program running in the computing platform 50 in a manner transparent to the remote user 84B. This off-loads traffic that would have been sent onto the local area network 42, reducing the traffic load. It also reduces the response time for the remote user, since the time delays associated with routing the call between the communications chassis 10 and a server on the network 42 is eliminated. The migration of the corporate Web page or corporate intranet server to a computing platform on the network edge, i.e., in a high performance communication access chassis 10 capable of serving a plurality of remote users simultaneously, is believed unique and highly advantageous.

Among the many advantages provided by this embodiment of the invention, network management is perhaps the most readily apparent. Requests from remote users are efficiently handled, either at the general purpose computing platform or in the corporate network, depending on the information that is stored in the communications chassis and the interests of the remote user. This produces quicker response times for many calls, decreases network traffic, and allows the network to support more remote users and applications processing. The operating system running at the chassis 10 preferably implements security and firewall functions at the network access point, i.e., the chassis 10, rather than at the server on the local area network, giving obvious security improvements.

The integration of the general purpose computing platform into the communications chassis provides for the ability of the computing platform to arbitrate across high density modem cards, while maintaining high performance. By virtue of the easy loading of software programs into the computing platform 50 via the external disk drive 38, off-the-shelf modular solutions for standard applications can be introduced into the communication chassis 10, allowing it to serve many functions, e.g., network fax, Internet access, web server, intranet server, and so on.

Another example of how the inventive communication chassis can be used will be described in conjunction with FIG. 5. In this embodiment, the chassis 10 is set up as a stand-alone, self-contained communication access and information system that is isolated, as shown, from the local area network 42. Incoming calls, for example up to 24 or 48 calls substantially simultaneously, are terminated in the general purpose computing platform 50 (FIG. 2) in the communications chassis 10. This is performed by the communication chassis of FIGS. 1–5 by demultiplexing the calls from the telephone line 12 at the TI NIC 18 and T1 NAC 20, routing the calls on the TDM bus 52 to the modems in the signal conversion system 22 and performing modem signal conversions by the twenty four or forty eight modems in the cards 22, and placing the data steam on the parallel bus 58 for transmission to the computing platform 50. In this embodiment, the Point-to-Point Protocol (PPP) processing may be distributed to the modems in the chassis in the manner described in the patent application of Daniel L. Schoo et al., Ser. No. 08/486,591, which is incorporated by reference herein. The packets of data with PPP header data are reassembled at the packet bus interface 64 at the card 24, and passed up to the applications programs running on the general purpose computing platform 50.

Figure 5:
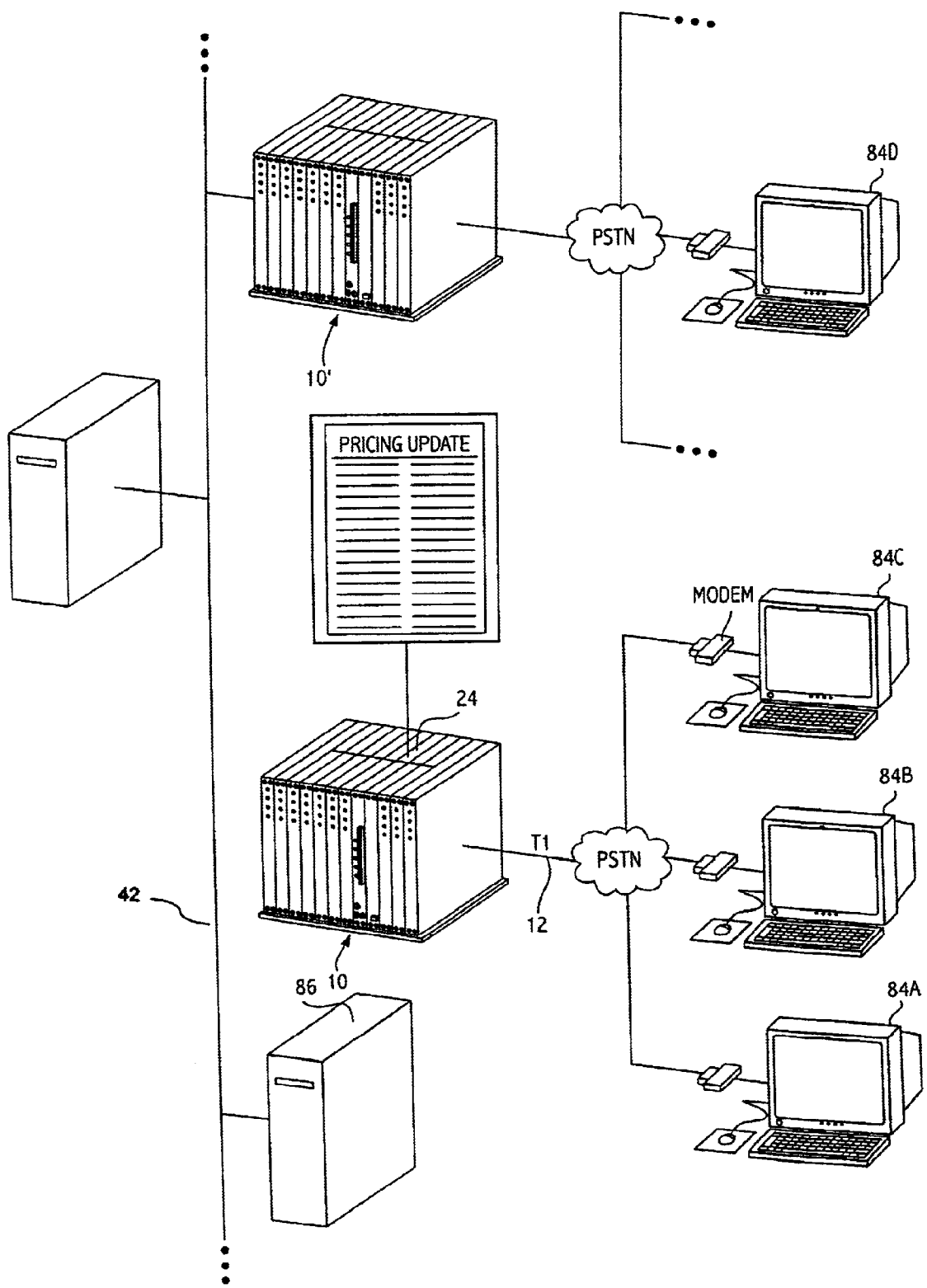
FIG. 5 is an illustration of another possible installation of the communication chassis of FIGS. 1 and 2, with the chassis isolated from the local area network for security reasons yet still proving complete communication access and server functionality for a plurality of remote users simultaneously.

The network administrator installing the chassis in the embodiment to FIG. 5 can be selective in the types of information that is stored on the hard disk 72 or peripheral storage devices 78, 80 etc. (FIG. 3) for the general purpose computing platform 50. Keeping this information on the general purpose computing platform, and isolating the chassis from the network, provides the ultimate in security because the chassis 10 is physically and electrically isolated from the network 42, and obviously from the servers 86 on the network 42 as well. However, to the remote users 84A, 84B, 84C, the chassis to 10 is completely transparent and the user retrieves information from the general purpose computing platform without knowing, or even caring, if the user is connected to the network 42. Thus, the chassis 10, though isolated from the local area network 42 for security reasons, still proves complete communication access and server functionality for a plurality of remote users simultaneously in a manner that is transparent to the users.

The network 42 may still be accessible to other select users 84 D via a second communication access chassis 10, which may or may not have the general purpose computer platform incorporated therein. For example, the second chassis 10' may have a general purpose computing platform and be operated as shown in FIG. 4, and provide routing, modem supervision, arbitration, security or other features for the users 84D that access the chassis 10'.

Figure 6:
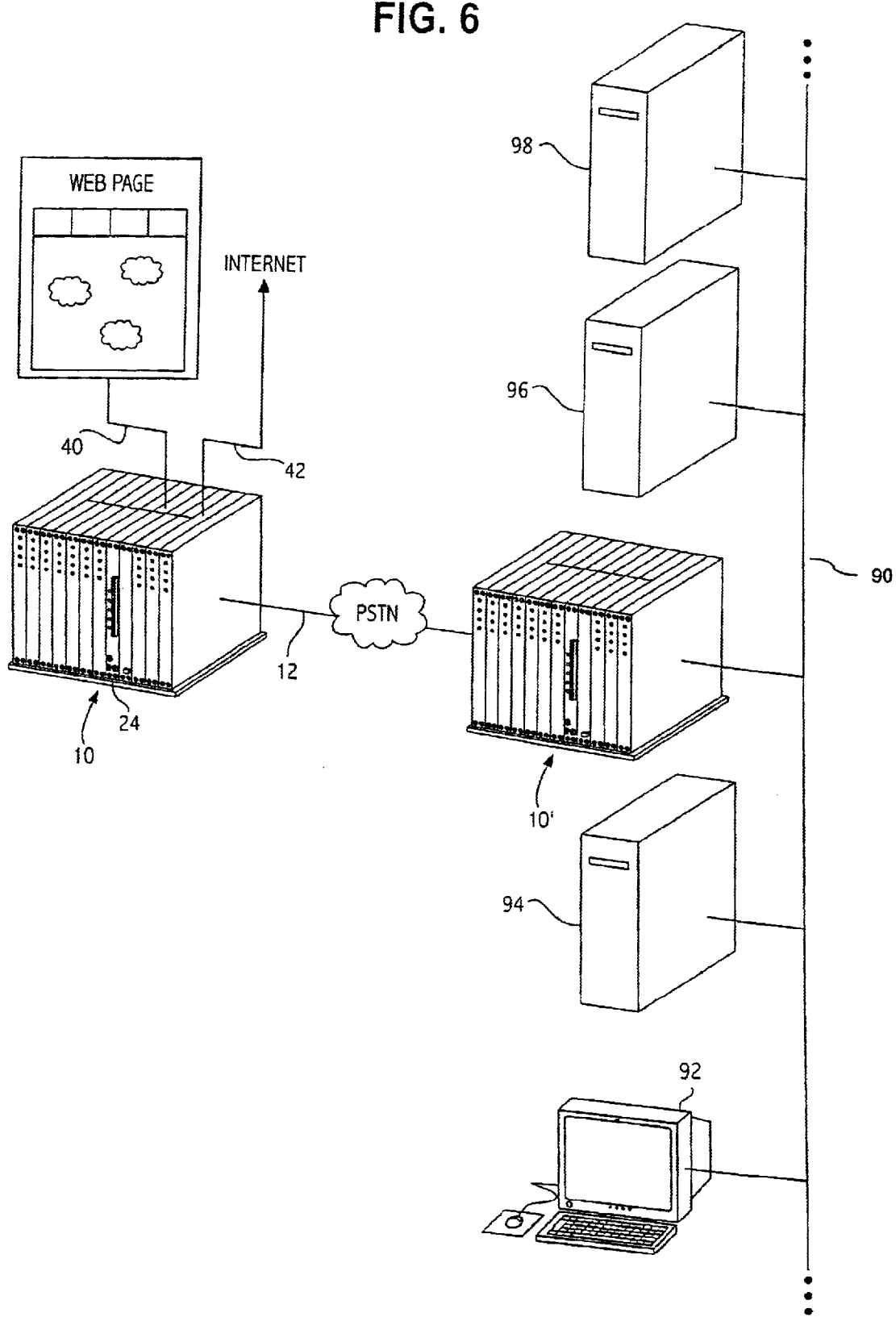
FIG. 6 is an illustration of still another possible installation of the communications chassis of FIGS. 1 and 2, with the chassis receiving network traffic from a computer network connected to the switched telephone network and providing access to computers on the network to the Internet.

A further example of how the communication access chassis may be implemented in an Internet access service provider embodiment is shown in FIG. 6. A network 90 such as a local area network having a plurality of computers 92, 94, 96, 98 is shown connected to the switched telephone network PSTN via a communication access chassis 10' or router, such as the Total Control Network Enterprise Hub™. Some of the network data traffic is directed via incoming digital telephone line 12 to a communication access chassis 10 in accordance with the invention. The general purpose computing platform in the EdgeServer™ card 24 is connected via network interface 66 to the Internet 42. Some of the data traffic is terminated locally in the general purpose computing platform in the EdgeServer™ card 24, with the card providing Web page type functionality due to the memory capacity on the peripheral storage bus 40. Other traffic from the network 90 is destined for other computers on the Internet 42 and routed through the EdgeServer™ card 24.

While the invention has been described in conjunction with presently preferred embodiments of the invention, persons of skill in the art will appreciate that variations may be made without departure from the scope and spirit of the invention. For example, the manner in which the chassis interfaces to the telephone network or local area or wide area network, the type of telephone lines that are used, and the internal chassis bus architecture are not considered critical. This true scope and spirit is defined by the appended claims, interpreted in light of the foregoing.

We claim:

1. A remote access server system for providing remote access to a computer network comprising:
   a network access server embodied in a communication access chassis processing calls from a plurality of remote users simultaneously along an incoming communications line and connecting said remote users to said computer network, said communication access chassis comprising, in combination,
   a first interface to said computer network;
   a second interface to said incoming communications line;
   an internal chassis bus connected to said second interface; and
   a general purpose computing platform installed in said communications chassis running a commercially available general purpose computer operating system, said general purpose computing platform further comprising an interface providing direct communication access between said general purpose computing platform and said internal chassis bus, thereby enabling said general purpose computing platform to receive and terminate said incoming calls from said second interface; and
   a machine readable memory coupled to said general purpose computing platform storing information accessible to said remote users,
   whereby said remote users may access said information via said machine readable memory and thereby avoid having to be connected to said network to access said information and thereby increasing the security of said network.

2. The apparatus of claim 1, wherein said machine readable memory comprises a hard disk in said general purpose computing platform.

3. The apparatus of claim 1, wherein said machine readable memory comprises a data storage device located on a peripheral bus connected to said general purpose computing platform.

4. The apparatus of claim 1, wherein said information comprises an intranet web page.

5. The apparatus of claim 1, wherein said general purpose computing platform dynamically assigns Internet Protocol addresses to said remote users using a Dynamic Host Configuration Protocol.

6. The apparatus of claim 1, wherein said general purpose computing platform registers and queries dynamic name to Internet Protocol address mappings using a Windows Internetwork Name Service.

7. The apparatus of claim 1, wherein said communication chassis combines plural dial-up lines using Multilink Channel Aggregation.

8. A method of providing access to information of interest to a remote user while retaining network security, comprising the steps of:
   connecting said remote user over a communications line to a network access server, said network access server processing incoming calls from other remote users and providing a network interface allowing selected other remote users to communicate with servers on a computer network coupled to said network interface;
   providing a general purpose computing platform in said network access server and a commercially available general purpose computing platform operating system in said general purpose computing platform;
   running said commercially available general purpose computing platform operating system in said network access server;
   providing information of interest to said remote user on a machine readable memory coupled to said general purpose computing platform; and
   terminating said connection from said remote user in said general purpose computing platform and providing access to said information of interest to said remote user without connecting said remote user to a server on said network, thereby increasing the security of said network.

9. The method of claim 8, wherein said network access server includes a plurality of modems and wherein said communications line comprises a digital multiplexed telephone line, and wherein said network access server includes an internal chassis bus complex connected to said plurality of modems.

10. The method of claim 8, wherein said machine readable memory comprises a data storage device located on a peripheral bus connected to said general purpose computing platform.

11. The method of claim 8, wherein said machine readable memory comprises a hard disk in said general purpose computing platform.

12. The method of claim 8, wherein said information comprises an intranet web page.

13. The method of claim 8, further comprising dynamically assigning an Internet Protocol address to said remote user using a Dynamic Host Configuration Protocol.

14. The method of claim 8, further comprising registering and querying a dynamic name to Internet Protocol address mapping using a Windows Internetwork Name Service.

15. The method of claim 8, further comprising combining plural dial-up lines using Multilink Channel Aggregation.

* * * * *